United States Patent
Victor et al.

(10) Patent No.: US 11,500,657 B1
(45) Date of Patent: Nov. 15, 2022

(54) ADAPTIVE ROW ENABLEMENT FOR INFORMATION HANDLING SYSTEMS

(71) Applicant: Dell Products L.P., Round Rock, TX (US)

(72) Inventors: Uboho Victor, San Antonio, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/503,515

(22) Filed: Oct. 18, 2021

(51) Int. Cl.
G06F 3/048 (2013.01)
G06F 9/451 (2018.01)
G06F 9/445 (2018.01)
G06F 3/04847 (2022.01)
G06F 3/04817 (2022.01)

(52) U.S. Cl.
CPC .......... *G06F 9/451* (2018.02); *G06F 3/04817* (2013.01); *G06F 3/04847* (2013.01); *G06F 9/44505* (2013.01)

(58) Field of Classification Search
CPC .. G06F 9/451; G06F 3/04817; G06F 3/04847; G06F 9/44505
See application file for complete search history.

(56) References Cited

U.S. PATENT DOCUMENTS

| | | | | |
|---|---|---|---|---|
| 2007/0288286 | A1* | 12/2007 | Linehan | G06Q 10/06 705/7.26 |
| 2019/0346885 | A1* | 11/2019 | Sepulveda | G06F 3/0482 |
| 2021/0191527 | A1* | 6/2021 | Pandit | G06F 3/0227 |

* cited by examiner

*Primary Examiner* — Thanh T Vu
(74) *Attorney, Agent, or Firm* — Terrile, Cannatti & Chambers; Stephen A. Terrile

(57) ABSTRACT

A system, method, and computer-readable medium are disclosed for performing an ancillary user interface adaptation operation. The ancillary user interface adaptation operation includes providing an information handling system with a primary integrated processor system and an ancillary integrated processor system, the primary integrated processor system executing a primary control point service, the ancillary integrated processor system executing an ancillary control point service, the ancillary integrated processor system controlling an ancillary user interface via the ancillary control point service; determining when a user initiates a change to the ancillary user interface; and, configuring the ancillary user interface in response to the change initiated by the user via the ancillary control point service.

20 Claims, 11 Drawing Sheets

ADAPTIVE ROW ENABLEMENT FOR INFORMATION HANDLING SYSTEMS

BACKGROUND OF THE INVENTION

Field of the Invention

The present invention relates to information handling systems. More specifically, embodiments of the invention relate to performing an ancillary user interface (UI) adaptation operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a computer-implementable method for performing an ancillary user interface adaptation operation, comprising: providing an information handling system with a primary integrated processor system and an ancillary integrated processor system, the primary integrated processor system executing a primary control point service, the ancillary integrated processor system executing an ancillary control point service, the ancillary integrated processor system controlling an ancillary user interface via the ancillary control point service; determining when a user initiates a change to the ancillary user interface; and, configuring the ancillary user interface in response to the change initiated by the user via the ancillary control point service.

In another embodiment the invention relates to a system comprising: a primary integrated processor system; an ancillary integrated processor system; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: executing a primary control point service via the primary integrated processor system; executing an ancillary control point service via the ancillary integrated processing system, the ancillary integrated processor system controlling an ancillary user interface via the ancillary control point service; determining when a user initiates a change to the ancillary user interface; and, configuring the ancillary user interface in response to the change initiated by the user via the ancillary control point service.

In another embodiment the invention relates to a computer-readable storage medium embodying computer program code, the computer program code comprising computer executable instructions configured for: executing a primary control point service via a primary integrated processor system; executing an ancillary control point service via an ancillary integrated processing system, the ancillary integrated processor system controlling an ancillary user interface via the ancillary control point service; determining when a user initiates a change to the ancillary user interface; and, configuring the ancillary user interface in response to the change initiated by the user via the ancillary control point service.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for performing an ancillary user interface (UI) adaptation operation. Certain aspects of the invention reflect an appreciation that users of information handling systems are used to, and expect, being able to use their devices to interact anywhere, at any time. Certain aspects of the invention likewise reflect an appreciation that such interactions should ideally be simple and intuitive. However, some interactions, such as changing operating system (OS) settings, checking the status of the system, and selecting certain applications typically require interacting directly with the system through its primary UI, which can be time consuming. Likewise, certain aspects of the invention reflect an appreciation that the inability to view a system's status, make changes to such settings, or select applications without interacting with the primary UI can be distracting and inconvenient. Accordingly, certain aspects of the invention reflect an appreciation that users generally desire faster, more efficient interactions with their systems, providing the information the user needs as they need it, when they need it.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
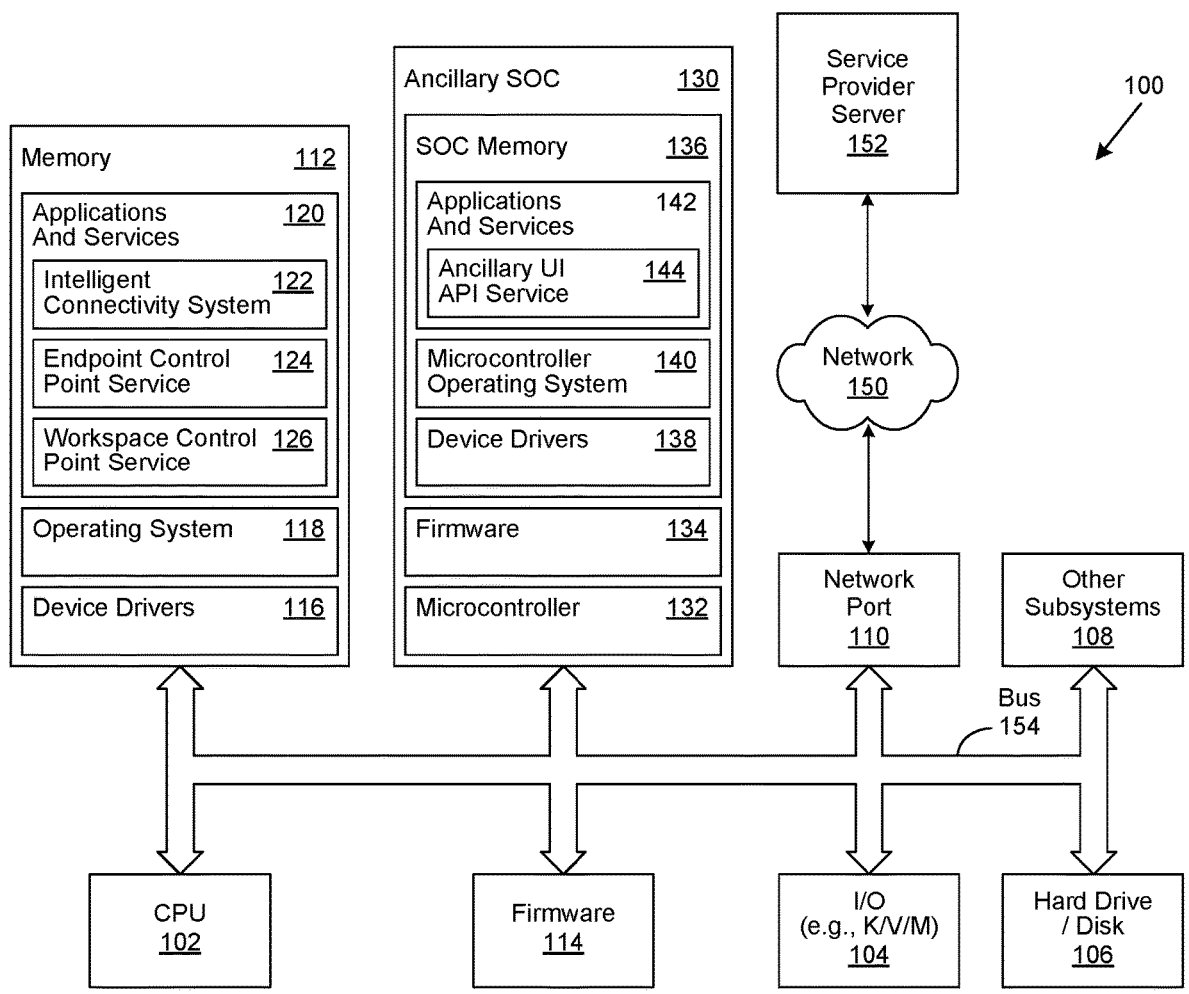
FIG. 1 shows a general illustration of components of an information handling system (IHS) as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 150, which is likewise accessible by a service provider server 152.

In certain embodiments, the information handling system 100 may likewise include system memory 112, firmware 114, and an ancillary system on a chip (SOC) 130, which is interconnected to the foregoing via one or more buses 154. As used herein, a system on a chip (SOC) may be defined as an integrated processor system which includes at least a processor, random access memory, and read only memory. In various embodiments, the SOC may be implemented within an integrated circuit. In various embodiments, the SOC may additionally include some or all of input/output ports, secondary storage, a radio modem, and a graphic processing unit (GPU). In various embodiments, the system memory 112 may be implemented to include an operating system (OS) 118 and certain device drivers 116. In various embodiments, the system memory 112 may likewise be implemented to include certain software applications and services 120. In certain embodiments, the software applications and services 120 may include an intelligent connectivity system (ICS) 122, an endpoint control point (CP) service 124, and a workspace CP service 126, or a combination thereof, as described in greater detail herein. In various embodiments, certain functionality of firmware 114 may be implemented in memory 112, using approaches familiar to skilled practitioners of the art.

In various embodiments, the ancillary SOC 130 may be implemented to include a microcontroller 132, SOC memory 136, and certain firmware 134. In various embodiments, the SOC memory 136 may be implemented to include certain device drivers 138, a microcontroller OS 140, and certain software applications and services 142. In certain embodiments, the software applications and services 142 may include an ancillary UI application programming interface (API) service 144. In one embodiment, the information handling system 100 is able to download the endpoint CP service 124, the workspace CP service 126, and the ancillary UI API service 144, or a combination thereof, from the service provider server 152.

In certain embodiments, the ancillary UI API service 144 may be implemented in the performance of an ancillary UI adaptation operation, as described in greater detail herein. In certain embodiments, the ancillary UI adaptation operation may be performed by the endpoint CP service 124, the workspace CP service 126, and the ancillary UI API service 144, or a combination thereof, during operation of an information handling system 100. In certain embodiments, the performance of the ancillary UI adaptation operation may result in the realization of improved operation of the information handling system 100, as described in greater detail herein.

Figure 2:
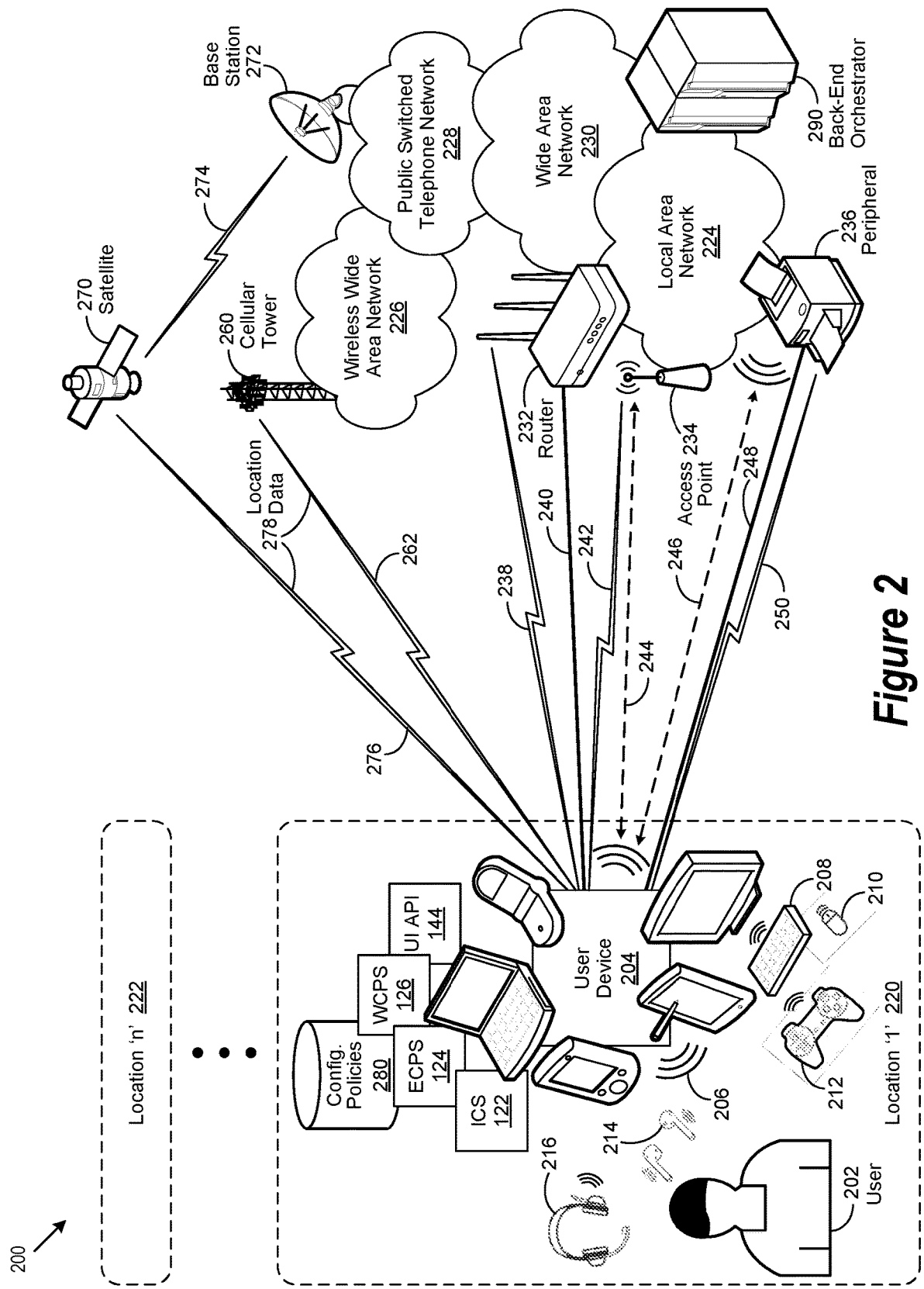
FIG. 2 is a block diagram of an intelligent connectivity environment (ICS)

FIG. 2 is a block diagram of an intelligent connectivity environment implemented in accordance with an embodiment of the invention. In certain embodiments, the intelligent connectivity environment 200 may include an intelligent connectivity system (ICS) 122, an endpoint control point service (ECPS) 124, a workspace control point service (WCPS) 126, an ancillary user interface (UI) application programming interface (API) service 144, and a back-end orchestrator 290, or a combination thereof, as described in greater detail herein. In certain embodiments, the ICS 122, the ECPS 124, the WCPS 126, and the ancillary UI API service 144 may be implemented on a user device 204. As used herein, a user device 204 broadly refers to an information handling system (IHS) such as a personal computer, a laptop computer, a tablet computer, a personal digital assistant (PDA), a smart phone, a mobile telephone, or other device that is capable of communicating and processing data.

In certain embodiments, a user 202 may use the user device 204 to interact with the ICS 122, the ECPS 124, the WCPS 126, and the ancillary UI API service 144, or a combination thereof. In certain embodiments, the ICS 122 may be implemented to perform an intelligent connectivity operation. As used herein, an intelligent connectivity operation broadly refers to any operation whose performance improves a user device's ability to utilize, as described in greater detail herein, network connectivity that may be available for provision by one or more networks.

In various embodiments, the ECPS 124, the WCPS 126, the ancillary UI API service 144, and the back-end orchestrator 290 may be implemented, individually or in combination, to perform an ancillary UI adaptation operation. As used herein, an ancillary UI adaptation operation broadly refers to any operation performed to adapt an ancillary UI's appearance, information presentation, or associated functionality, or a combination thereof, as described in greater detail herein, according to the current use of a particular workspace, likewise described in greater detail, executing on an associated user device 204. In certain embodiments, a particular configuration policy 280, described in greater detail herein, may be used by the ECPS 124, the WCPS 126, and the ancillary UI API service 144, or a combination thereof, in the performance of an ancillary UI adaptation operation, as likewise described in greater detail herein. In certain embodiments, as likewise described in greater detail herein, the back-end orchestrator 290 may be implemented to manage the definition, storage, retrieval, and provision of such a configuration policy 280. In these embodiments, the definition of the configuration policies 280, and the method by which they may be used by the ECPS 124, the WCPS 126, and the ancillary UI API service 144, or a combination thereof, in the performance of a particular ancillary UI adaptation operation is a matter of design choice.

In certain embodiments, performance of a particular ancillary UI adaptation action may be initiated as a result of an IHS receiving certain associated system event input information. In various embodiments, the system event input information may be provided in the form of user 202 input, as described in greater detail herein. In certain of these embodiments, the user 202 input may be received as a result of user interaction with an ancillary UI, as likewise described in greater detail herein. In certain embodiments, as likewise described in greater detail herein, user 202 input received as a result of user interaction with an ancillary UI may be processed by an associated ancillary SOC.

In various embodiments, the system event input information may be provided in the form of information provided by one or more components, described in greater detail herein, associated with the IHS. As an example, the IHS may be implemented with one or more components, which in turn may be implemented, individually or in combination, to provide location information (e.g., a collaboration room), network connectivity availability information (e.g., wireless access point connectivity), proximity and availability of certain peripherals (e.g., a wireless-enabled display monitor), and so forth.

In certain embodiments, the intelligent connectivity environment 200 may include a Local Area Network (LAN) 224, a Personal Area Network (PAN) 206, a Wireless Local Area Network (WLAN), a Wireless Wide Area Network (WWAN) 226, a satellite 270 network, the public switched telephone network (PSTN) 228, and a Wide Area Network (WAN) 230, such as the Internet, or a combination thereof. In certain embodiments, the LAN 224 may be based upon one or more protocols, such as Ethernet, Asynchronous Transfer Mode (ATM), Token Ring, or Fiber Distributed Data Interface (FDDI). In certain embodiments, the PAN 206 may be based upon one or more protocols commonly associated with Bluetooth, ZigBee, or ultrawideband (UWB). In certain embodiments, the WLAN may be based upon one or more variants of the IEEE 802.11 wireless communication standard. In certain embodiments, the WWAN 226 may be based upon one or more generations of known cellular network protocols, commonly referred to as 3G, 4G, 5G, and so forth. In certain embodiments, the WAN 230 may be based upon one or more protocols, such as X.25, Frame Relay, Asynchronous Transfer Mode (ATM), or Telecommunications Protocol/Internet Protocol (TCP/IP).

In certain embodiments, the user device 204 may be implemented with communication hardware and software that allows it to communicate with one or more wirelessly-enabled input/output (I/O) devices via a PAN 206 network link. Examples of such wirelessly-enabled I/O devices include a keyboard 208, a mouse 210, a game controller 212, earphones or earbuds 214, a headset 216, and so forth. Skilled practitioners of the art will be familiar with a network link, which as commonly used, refers to the physical and logical network component used to interconnect hosts or nodes in a network. Those of skill in the art will likewise be aware that such network links are generally established through the link layer of a telecommunications protocol stack, such as the Internet protocol suite or the Open Systems Interconnection (OSI) model. As typically implemented, the link layer refers to a group of methods and communications protocols confined to the network link that a host, such as a particular user device 204, is physically connected to.

In certain embodiments, the user device 204 may be implemented with communication hardware and software that allows it to communicate with one or more access points 234 via a PAN 242 network link, or a WLAN 244 network link, or both. Skilled practitioners of the art will be familiar with a wireless access point (AP) 234, which generally refers to a networking hardware device that allows a wirelessly-enabled device, such as a particular user device 204, to connect to a wired network, such as a LAN 224. In various embodiments, the AP 234 may be implemented as a stand-alone device. In certain of these embodiments, the AP 234 may be implemented to connect to a router 232 through a LAN 224. In certain embodiments, the functionality of an AP 234 may be implemented as an integral component of the router 232.

In certain embodiments, the user device 204 may be implemented with communication hardware and software that allows it to communicate with one or more peripherals 236 via a PAN 246 network link, a LAN 248 network link, or a WLAN 250 network link, or a combination thereof. In certain embodiments, the user device 204 may be implemented with communication hardware and software that allows it to communicate with one or more routers 232 via a LAN 240 network link, or a WLAN 238 network link, or both. In certain embodiments, the user device 204 may be implemented with communication hardware and software that allows it to communicate with one or more WWAN 226 cellular towers 260 via a WWAN 262 network link. In certain embodiments, the user device 204 may be implemented with communication hardware and software that allows it to communicate with one or more satellites 270 via a satellite 276 network link.

In various embodiments, a particular cellular tower 260, or a particular satellite 270, or a combination of the two, may be implemented, individually or in combination, to provide certain location data 278, familiar to those of skill in the art, to the user device 204. In certain embodiments, the user device 204 may be configured to receive such location data 278, which is used as a data source for determining the user device's 204 location '1' 220 through 'n' 222. In certain embodiments, the location data 278 may include Global Position System (GPS) data provided by a GPS satellite 270. In certain embodiments (not shown), the location data 278 may include various Internet Protocol (IP) or other network address information assigned to the user device 204. In certain embodiments (not shown), the location data 278 may likewise be provided by a router 232, or an AP 234, or both.

In certain embodiments, one or more satellites 270 may be implemented to use known satellite communication protocols to establish a satellite network link 274 to a base station 272. In various embodiments, the base station 272 may in turn be implemented to be connected to the PSTN 228, which in certain embodiments may likewise be implemented to be connected to one or more WWANs 230, or one or more WANs 230, or a combination thereof. In various embodiments, one or more LANs 224 may be implemented to be connected to one or more WANs 230, or a combination thereof. In certain of these embodiments, one or more routers 232, may be implemented, individually or in combination, to connect a particular LAN 224 to a particular WAN 230.

In various embodiments, the ICS 122 may be implemented to establish a particular network link 206, 238, 240, 242, 244, 246, 248, 250, 262, 276 as the user device 204 moves from location '1' 220 to location 'n' 222. In certain of these embodiments, the establishment of a particular network link 206, 238, 240, 242, 244, 246, 248, 250, 262, 276 may be based upon the availability of connectivity to a corresponding network. In various embodiments, the ICS 122 may be implemented to switch from one network link 206, 238, 240, 242, 244, 246, 248, 250, 262, 276 to another. In certain of these embodiments, such switching may be based upon the respective signal strength, available bandwidth, network latency, or a combination thereof, associated with the availability of connectivity to a corresponding network.

In certain embodiments, the ICS 122 may be implemented to switch from one network link 206, 238, 240, 242, 244, 246, 248, 250, 262, 276 to another according to the user device 204 being present at a particular location '1' 220 through 'n' 222. In various embodiments, the ICS 122 may be implemented to establish two or more simultaneous network links 206, 238, 240, 242, 244, 246, 248, 250, 262, and 276. In certain of these embodiments, bandwidth respectively corresponding to the two or more network links 206, 238, 240, 242, 244, 246, 248, 250, 262, and 276 may be combined to provide aggregated network link bandwidth for use by the user device.

In various embodiments, the ICS 122 may be implemented to assign network connectivity corresponding to a particular software application, or a user device 204 process, to a particular network link 206, 238, 240, 242, 244, 246, 248, 250, 262, 276. In certain embodiments, the ICS 122 may be implemented to respectively assign two or more software applications, or user device 204 processes, to two or more network links 206, 238, 240, 242, 244, 246, 248, 250, 262, and 276 according to their corresponding attributes. For example, the ICS 122 may be implemented to assign a wireless-enabled gaming controller 212 to a PAN 206 link, while information generated and received by a game executing on the user device 204 may be assigned to WLAN 238 network link.

In certain of these embodiments, the respective assignment of two or more software applications, or user device 204 processes, or a combination thereof, to two or more network links 206, 238, 240, 242, 244, 246, 248, 250, 262, 276 may be according to the user device 204 being present at a particular location '1' 220 through 'n' 222. As an example, only a lower-speed (e.g., 300 Mbps) WLAN 238 network link may be available at location '1' 220, but both a high-speed (e.g., 100 Gbps) LAN 240 network link and a higher-speed (e.g., 1.7 Gbps) WLAN 238 network link may be available at location 'n' 222. In this example, the user 202 may wish to play a particular online game while simultaneously conducting an online chat session, whether they are at location '1' 220 or 'n' 222. To continue the example, it is possible that the bandwidth of the WLAN 238 network link at location '1' 220 may be barely adequate to support the network connectivity needs of the on-line game. As a result, the additional overhead of network traffic associated with the online chat session may result in the game not performing as responsively as desired.

However, the ICS 122 may be implemented to respectively assign the online chat session to the higher-speed WLAN 238 network link and the online game to the high-speed LAN 240 network link available at location 'n' 222. Accordingly, responsiveness of the online game will likely be improved due to the 100 Gbps speed provided by the LAN 238 network link available at location 'n' 220, while the online chat session will be adequately supported by the 1.7 Gbps speed of the WLAN 240 network link. Skilled practitioners of the art will recognize that many such embodiments and examples are possible. Accordingly, the foregoing is not intended to limit the spirit, scope or intent of the invention.

In certain embodiments, the ICS 122 may be implemented to establish and manage one or more virtual private network (VPN) connections on one or more corresponding network links. Skilled practitioners of the art will be familiar with a VPN, which as typically implemented, uses known tunneling protocols to extend a private network, such as a private LAN 224, across a public WAN 230, such as the Internet, to enable users 202 to use their user devices 204 to send and receive data to and from an external resource, such as a remote server, as if it was directly connected to the private network. Certain embodiments of the invention reflect an appreciation that a single VPN may not always be sufficient for a particular operational mode. Accordingly, in certain embodiments, the ICS 122 may likewise be implemented to perform a multi-link network traffic routing operation. As used herein, a multi-link traffic routing operation broadly refers to any operation performed to route network traffic across two or more network links.

Figure 3:
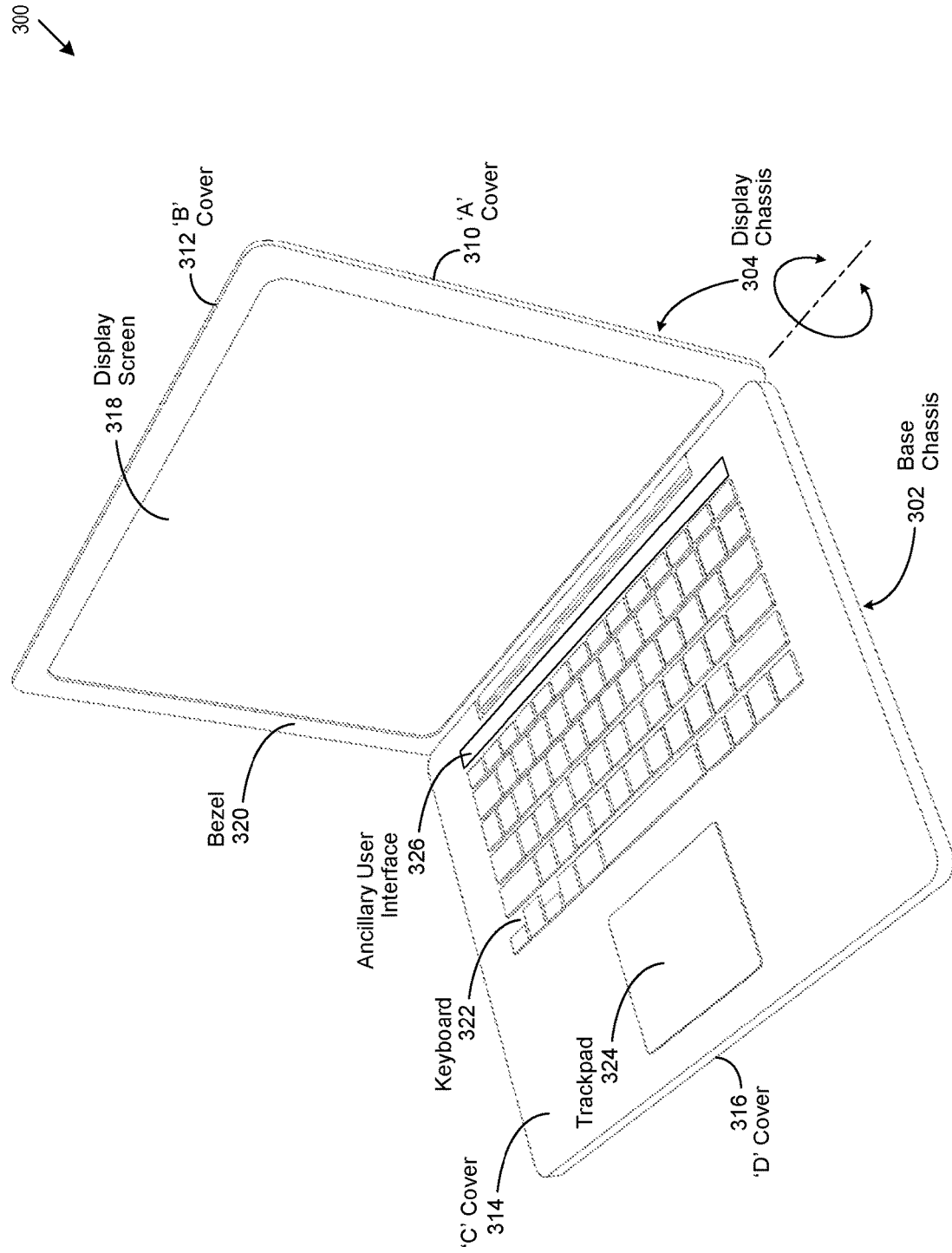
FIG. 3 shows a perspective view of an ancillary user interface (UI) implemented on an example portable information handling system.

FIG. 3 shows a perspective view of an ancillary user interface implemented in accordance with an embodiment of the invention on an example portable information handling system (IHS). It will be appreciated that some or all of the components of the IHS 100 described in the text associated with FIG. 1 may be included within the portable IHS 300 shown in FIG. 3. As shown in FIG. 3, the portable IHS 300 may be configured to include a base chassis 302 and a display chassis 304 shown in an open configuration. It will be appreciated that a closed configuration would have the display chassis 304 fully closed onto the base chassis 302.

In certain embodiments, the base chassis 302, or the display chassis 304 of the portable IHS 300, or the two combined, may comprise an outer case or shell. In certain embodiments, the portable IHS 300 may include a plurality of chassis portions. In certain embodiments, the portable IHS 300 may include some or all of an 'A' cover 310, a 'B' cover 312, a 'C' cover 314, and a 'D' cover 316. In certain embodiments, the 'A' cover 310 and the 'B' cover 312 may be configured to provide the display chassis 304. In certain embodiments, the 'C' cover 314 and the 'D' cover 316 may be configured to provide the base chassis 302.

In certain embodiments, the 'A' cover 310 may be configured to enclose a portion of the display chassis 304 of the IHS 300. In certain embodiments, the 'B' cover 312 may be configured to enclose another portion of the display chassis 304 of the IHS 300. In certain embodiments, the 'B' cover 312 may be configured to include a display screen 318 and an associated bezel 320.

In certain embodiments, the 'C' cover 314 may be configured to enclose a portion of the base chassis 302 of the IHS 300. In certain embodiments, the 'C' cover 314 may be configured to include a keyboard 322, a trackpad 324, an ancillary user interface (UI) 326, other input/output (I/O) devices (not shown), or a combination thereof. In certain embodiments (not shown) the ancillary UI 326 may be configured to be incorporated into the display screen 318, its bezel 320, or the 'A' cover 310 of the portable IHS 300, or a combination thereof. In various embodiments, certain components of the portable IHS 300, such as a mother board, may be mounted within the 'C' cover 314. In certain embodiments, the 'D' cover 316 may be configured to enclose another portion of the base chassis 302 of the portable IHS 300.

In certain embodiments, the 'A' cover 310 may be configured to form a top outer protective shell, or a portion of a lid, for the portable IHS 300, while the 'D' cover 316 may be configured to form a bottom outer protective shell, or a portion of a base, for the portable IHS 300 when placed in a closed configuration. In certain embodiments, the 'A' cover 310 and the 'D' cover 316 may be substantively parallel to one another when in a fully closed configuration. In certain embodiments, both the 'A' cover 310 and the 'D' cover 316 may be comprised entirely of metal. In certain embodiments, the 'A' cover 310 and 'D' cover 316 may include both metallic and plastic components. For example, plastic components that are radio-frequency (RF) transparent may be used to form a portion of the 'A' cover 310.

In various embodiments, the 'A' cover 310 may be movably connected to a back edge of the 'D' cover 316 via one or more hinges. In certain of these embodiments, the hinges may be configured to allow the 'A' cover 310 to rotate from and to the 'D' cover 316, allowing for multiple orientations of the portable IHS 300. In certain embodiments, the portable IHS 300 may include a sensor to detect the orientation of the portable IHS 300 and activate or deactivate one or more antenna systems based on the occurrence of a particular orientation.

In certain embodiments, the portable IHS 300 may be a laptop with limited rotation of the 'A' cover 310 with regard to the 'D' cover 316, for example up to a 180 degree rotation arc. In certain embodiments the portable IHS 300 may be configured as a convertible IHS 300, with full rotation to a tablet configuration. In various embodiments, the portable IHS 300 may be configured as a tablet computer or a mobile phone. In certain of these embodiments (not shown), the keyboard 322, trackpad 324, display screen 318, bezel 320, and ancillary UI 326, of some combination thereof, may be integrated into the 'A' cover. In these embodiments, 'B' cover 310 and 'C' cover 314 are not implemented in the portable IHS 300, while the 'D' cover 316 may be implemented to form a bottom outer protective shell.

In various embodiments, the ancillary UI 326 may be implemented in the form of an adaptive row display (ARD). In certain of these embodiments, the ARD may be implemented to include a touch-capacitive screen, familiar to those of skill in the art, that is capable of displaying information in the form of text or icons, or a combination of the two. In certain embodiments, the touch-capacitive screen of such an ARD may be implemented to receive user input through a user gesture, such as a finger tap on a particular icon or text displayed within the ARD. In various embodiments, the ARD may be implemented in the shape of a bar. In certain embodiments, one or more ARD's may be placed on the surface of the 'C' cover 314 above the keyboard 322, on the surface of the 'B' cover within the bezel 320 or display screen 318, or on the surface of the 'A' cover 310 or 'D' cover 316, or a combination thereof.

In various embodiments, the ancillary UI 326 may be implemented to display certain information related to the system configuration mode, described in greater detail herein, the portable IHS 300 may be currently be in. In certain of these embodiments, the ancillary UI 326 may likewise be implemented to display one or more operational parameters associated with its current system configuration mode. In various embodiments, the ancillary UI 326 may be implemented to provide certain user input received from a user to an ancillary user interface (UI) application program interface (API) service, described in greater detail herein, that is executing on an associated ancillary system on a chip (SOC), likewise described in greater detail herein. In various embodiments, the ancillary UI API service may be implemented to provide certain information associated with the results of a particular ancillary UI adaptation operation to the ancillary UI 326. In certain embodiments, the ancillary UI 326 may be implemented to display such information for a user to view. Skilled practitioners of the art will recognize that many such embodiments are possible. Accordingly, the foregoing is not intended to limit the spirit, scope, or intent of the invention.

Figure 4:
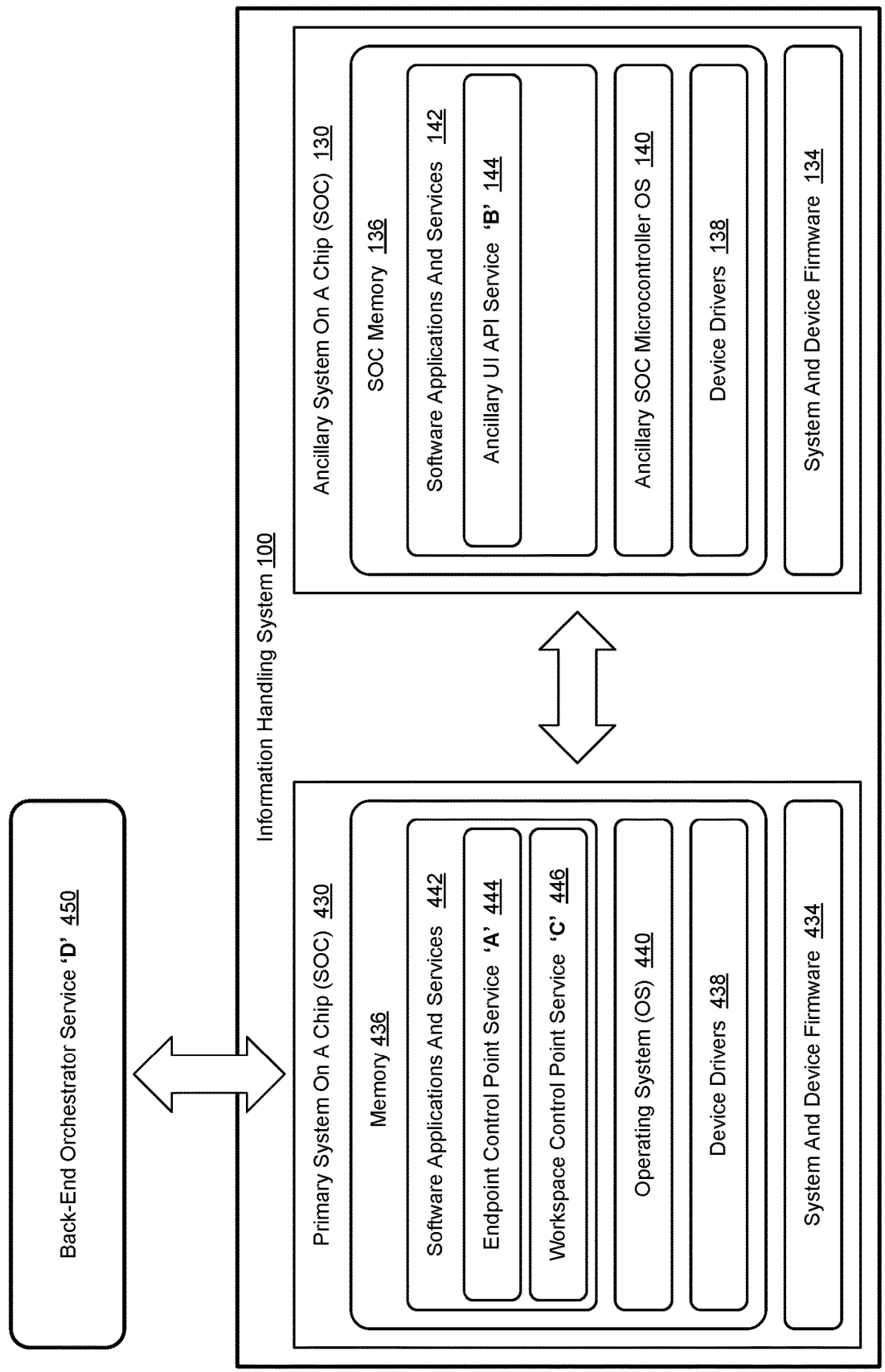
FIG. 4 shows a simplified block diagram of an IHS implemented with a back-end orchestrator service.

FIG. 4 shows a simplified block diagram of an information handling system (IHS) implemented in accordance with an embodiment of the invention with a back-end orchestrator service. In various embodiments, an IHS 100 may be implemented to include a primary system on a chip (SOC) 430 and an ancillary SOC 130. In certain of these embodiments, the IHS 100 may be implemented to interact with a back-end orchestrator service 'D' 450 during the performance of an ancillary user interface (UI) adaptation operation, as described in greater detail herein.

In various embodiments, the primary SOC 430 may be implemented to include memory 430 and certain system and device firmware 434, familiar to skilled practitioners of the art. In various embodiments, the memory may be implemented to include certain device drives 438, an operating system (OS) 440, and certain software applications and services 442. In certain embodiments, the software applications and services 442 may be implemented to include an endpoint control point (CP) service 'A' 444 and a workspace CP service 'C' 446. In certain embodiments, some or all of the functional capabilities of the primary SOC 430 may be provided by some or all of the individual components of the information handling system (IHS) described in the descriptive text associated with FIG. 1.

In various embodiments, the ancillary SOC 130 may be implemented to include certain system and device firmware 134 and SOC memory 136. In various embodiments, the SOC memory 136 may be implemented to include certain device drivers 130, an ancillary SOC microcontroller OS 140, and certain software applications and services 142. In certain embodiments, the software applications and services 142 may be implemented to include an ancillary user interface (UI) application program interface (API) service 'B' 144.

In certain embodiments, the endpoint CP service 'A' 444, the workspace CP service 'C' 446, the ancillary UI API service 'B' 144, and the back-end orchestrator service 'D' 450 may be implemented, individually or in combination, to perform one or more ancillary UI adaptation operations, described in greater detail herein. In certain embodiments, the endpoint CP service 'A' 444 may be implemented to use the OS 440 to provide its various functionalities. In certain embodiments, the endpoint CP service 'A' 444 may be implemented to be a control point for telemetry between itself and the workspace CP service 'C' 446. In certain embodiments, the endpoint CP service 'A' 444 may be implemented to be a control point between restful API communication exchanges, familiar to those of skill in the art, between itself and the back-end orchestrator service 'D' 450.

In various embodiments, the endpoint CP service 'A' 444 may be implemented to be a control point for communication of certain telemetry between itself, the workspace CP service 'C' 446, and the back-end orchestrator service 'D' 450. In various embodiments, the endpoint CP service 'A' 444 may be implemented to configure the ancillary UI API service 'B' 144 through certain API calls and inter-process communications (IPCs) subsequent to receiving certain orchestration and configuration policy information from the back-end orchestrator service 'D' 450. In certain of these embodiments, the endpoint CP service 'A' 444 may be implemented to configure the ancillary UI API service 'B' 144 without orchestration and configuration policy information being provided by the back-end orchestrator service 'D' 450.

In various embodiments, the endpoint CP service 'A' 444 may be implemented to perform certain computational or inference operations to determine a particular configuration for an ancillary UI, described in greater detail herein, associated with the ancillary SOC 130. As an example, the configuration may be used to map a particular software application or service executing in the user's workspace to a hot key displayed by the ancillary UI. As another example, the configuration may be inferred from telemetry associated with a user's behavior when interacting with the IHS 100, or the ancillary UI, or both. As yet another example, the configuration may be based upon an active foreground workspace, where one or more IPCs are triggered to use the ancillary UI API service 'B' 144 to change the content displayed within the ancillary UI. In certain embodiments, such IPCs may be implemented to send JavaScript Object Notation (JSON) metadata payloads between the endpoint CP service 'A' 444 and the ancillary UI API service 'B' 144.

In various embodiments, the ancillary UI API service 'B' 144 may be implemented to interact with the endpoint CP service 'A' 444 to perform certain discovery operations to determine the capabilities of the IHS 100. In certain embodiments, the ancillary UI API service 'B' 144 may be implemented to receive initial configuration information from the endpoint CP service 'A' 444 via restful APIs. In various embodiments, the ancillary UI API service 'B' 144 may be implemented to receive steady-state API calls from the endpoint CP service 'A' 444 to display, or configure, the contents of the ancillary UI, or both, based upon the certain telemetry associated with a software application or service executing in the user's active workspace.

In certain embodiments, the workspace CP service 'C' 446 may be implemented to provide a control point for IPCs between itself and the endpoint CP service 'A' 444. In various embodiments, the workspace CP service 'C' 446 may be implemented to gather certain data flowing between a particular software application or service executing in the user's active workspace and the endpoint CP service 'A' 444. In various embodiments, the back-end orchestrator service 'D' 450 may be implemented to use certain configuration policies to configure the endpoint CP service 'A' 444 upon its initiation. In various embodiments, the back-end orchestrator service 'D' 450 may be implemented to use telemetry received from the endpoint CP service 'A' 444 to perform certain computational or inference operations, described in greater detail herein. In certain of these embodiments, the back-end orchestrator service 'D' 450 may be implemented to provide the results of such computational or inference operations to the endpoint CP service 'A' 444 using API approaches familiar to skilled practitioners of the art.

As an example, a user may select an email icon displayed within an ancillary UI, described in greater detail herein. In response, the ancillary UI API service 'B' 144 communicates information associated with the user's interaction with the ancillary UI to the endpoint CP service 'A' 444. In turn, the endpoint CP service 'A' 444 conveys the information associated with the user's interaction with the ancillary UI to the back-end orchestrator service 'D' 450 to see if there is a configuration policy that does not allow the user to launch an associated email application. If not, then the endpoint CP service 'A' 444 communicates with the workspace CP service 'C' 446, which in turn launches the email application associated with the email icon and a blank email is then displayed within the primary display of its associated IHS 100.

As another example, a user may elect to place a first workspace in a hibernation mode and activate a second workspace. In this example, the workspace CP service 'C' 446 associated with the first workspace provides information to the endpoint CP service 'A' 444 that it has been placed in hibernation mode. In turn the endpoint CP service 'A' 444 provides the same information to the back-end orchestrator service 'D' 450. In response, the back-end orchestrator service 'D' 450 provides instructions for the endpoint CP service 'A' 444 to change the context of the ancillary UI to the second workspace. As a result, the endpoint CP service 'A' 444 sends an API call with the changes to the ancillary UI API service 'B' 144, which in turn changes the contents of the ancillary UI accordingly.

As yet another example, a user may have two workspaces that are simultaneously active, one operating in the foreground, the other operating in the background. In this example, the user selects which of the two workspaces to operate in the foreground. In response, the endpoint CP service 'A' 444 sends the selection information to the back-end orchestrator service 'D' 450, which in turn provides instructions for the endpoint CP service 'A' 444 to make the selected workspace active and to change the context of the ancillary UI accordingly. As a result, the endpoint CP service 'A' 444 sends an API call with the changes to the ancillary UI API service 'B' 144, which in turn changes the contents of the ancillary UI to match the selected workspace.

As yet still another example, a user may elect to launch a new software application in their active workspace. In this example, the workspace CP service 'C' 446 notifies the endpoint CP service 'A' 444 that a new software application has been launched. In response, the endpoint CP service 'A' 444 provides certain inference information related to the launch of the new software application to the back-end orchestrator service 'D' 450, which in turn uses it make any relevant configuration policy changes.

The back-end orchestrator service 'D' 450 then communicates any configuration policy changes to the endpoint CP service 'A' 444. The endpoint CP service 'A' 444 then sends an API call with any changes to the configuration policy to the ancillary UI API service 'B' 144, which in turn changes the contents of the ancillary UI to reflect the launch of the new software application. Those of skill in the art will recognize that many such examples are possible. Accordingly, the foregoing is not intended to limit the spirit, scope, or intent of the invention.

In various embodiments, one or more ancillary UI adaptation operations may be performed to seamlessly adapt the operation of ancillary UI, described in greater detail herein, in response to a user's interaction with a particular software application or service executing within their active workspace. In certain embodiments, the operation of the ancillary UI may be adapted in response to a user launching a particular software application or service within their active workspace. In various embodiments, the operation of the ancillary UI may be adapted in response to certain user actions when interacting with a particular software application or service executing within their active workspace. In various embodiments, the operation of the ancillary UI may be adapted to provide certain information or recommendations to a user according to their interaction with a particular software application or service executing within their active workspace. In various embodiments, the operation of the ancillary UI may be adapted to expose, or enable, certain endpoint capabilities according to their interaction with a particular software application or service executing within their active workspace In various embodiments, the operation of the ancillary UI may be adapted according to a most recent mode of operation. In certain of these embodiments, the most recent mode of operation may be implemented to provide the user a list of the most-recently used software applications within their active workspace. In various embodiments, the operation of the ancillary UI may be adapted according to a full screen mode of operation. In certain of these embodiments, the full screen mode of operation may be implemented to provide the user contextual recommendations via the ancillary UI while they interact with a particular software application within the primary display of the IHS 100.

In various embodiments, the operation of the ancillary UI may be adapted according to an endpoint capabilities mode of operation. In certain of these embodiments, the endpoint capabilities mode of operation may be implemented to provide the user a list of the IHS's 100 capabilities as icons displayed within the ancillary UI, which the user can interact with to enable or disable. Skilled practitioners of the art will recognize that many such modes of operation are possible. Accordingly, the foregoing is not intended to limit the spirit, scope, or intent of the invention.

Figure 5A:
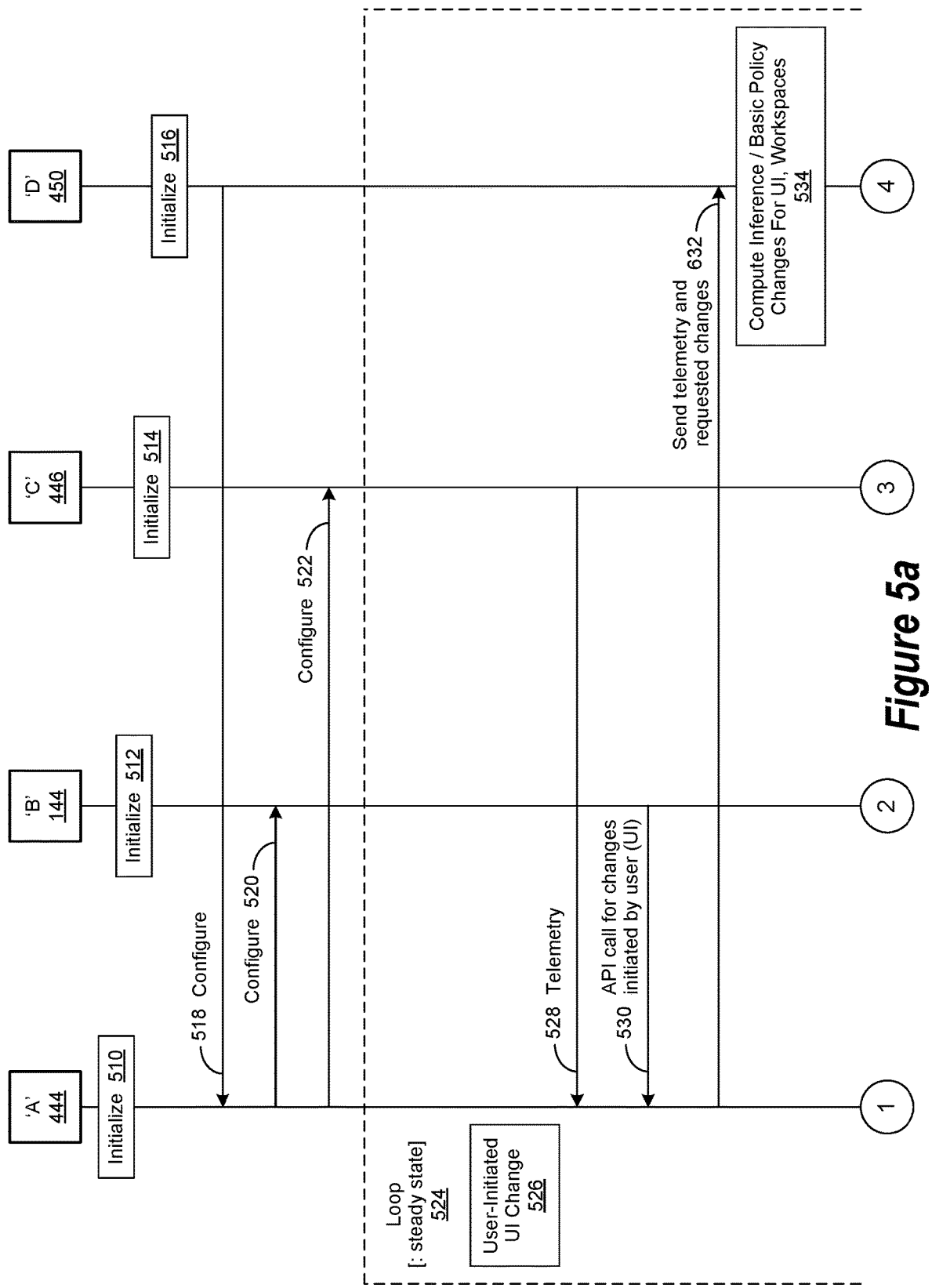
FIGS. 5a and 5b show process flows associated with the performance of certain ancillary UI adaptation operations.
Figure 5B:
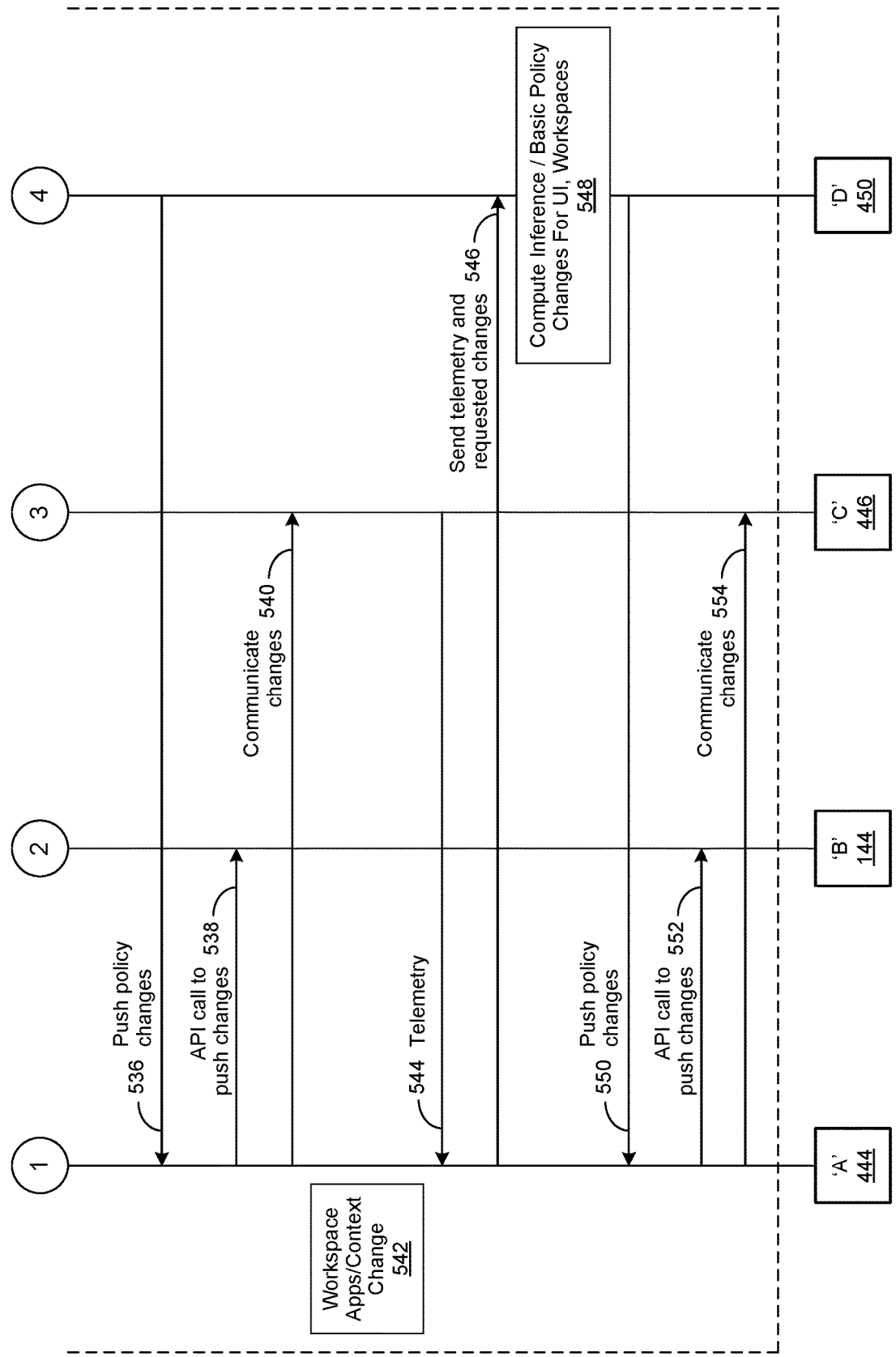

FIGS. 5a and 5b show process flows associated with the performance of certain ancillary user interface (UI) adaptation operations implemented in accordance with an embodiment of the invention. In certain embodiments, an endpoint control point (CP) service 'B' 524, and a workspace CP service 'C' 446 may be implemented on a primary SOC, while an ancillary UI application program interface (API) service 'A' 144 may be implemented on an ancillary SOC, as described in greater detail herein. Likewise, in certain embodiments, a back-end orchestrator service 'B' 450, described in greater detail herein, may be implemented on a back-end orchestrator system, as likewise described in greater detail herein.

In this embodiment, ancillary UI adaptation operations are begun by the endpoint CP service 'A' 444, the ancillary UI API service 'B' 444, the workspace CP service 'C' 446, and the back-end orchestrator service 'D' 450 being sequentially initialized in steps 510, 512, 514, and 516. Then, in step 518, the back-end orchestrator service 'D' 450 performs a configuration operation to configure the endpoint CP service 'A' 444 for ancillary UI adaptation operations. In turn, the endpoint CP service 'A' 444 respectively configures the ancillary UI API service 'B' 446 and the workspace CP service 'C' 446 for ancillary UI adaptation operations in steps 520 and 522.

Ongoing steady-state loop operations are then initiated in step 524, followed by a user-initiated change to the ancillary UI, described in greater detail herein, being performed in step 526. In response, the workspace CP service 'C' 446 provides telemetry associated with applications and services that may be executing in the workspace currently being used by a user to the endpoint CP service 'A' 444. Subsequently, the ancillary UI API service 'B' 144 provides an API call for UI changes initiated by the user to the endpoint CP service 'A' 444 in step 530.

In response, the endpoint CP service 'A' 444 sends the requested change to the UI, along with telemetry associated with the applications and services currently executing in the user's workspace, to the back-end orchestrator in step 632. In turn, the back-end orchestrator service 'D' 450 computes inferences from the provided information, which may be used in step 534 to determine certain changes to configuration policies associated with the applications and services executing in the user's workspace. Thereafter, the back-end orchestrator service 'D' 450 pushes any configuration policy changes to the endpoint CP service 'A' 444 in step 536.

In response, the endpoint CP service 'A' 444 places an API call in step 538 to the ancillary UI API service 'B' 144 to push any configuration policy changes to it, while likewise communicating any configuration policy changes to the workspace CP service 'C' 446 in step 540. The user's workspace is then monitored in step 542 for any changes in the context of applications or services executing therein. Telemetry associated with such changes are then communicated by the workspace CP service 'S' 446 in step 544.

Any such changes, along with associated telemetry, is then sent as a request to the back-end orchestrator service 'D' 450 in step 546. The back-end orchestrator service 'D' 450 then processes the request and associated telemetry in step 548 to computes inferences, which may be used to determine certain changes to configuration policies associated with the applications and services executing in the user's workspace. Thereafter, the back-end orchestrator service 'D' 450 pushes any configuration policy changes to the endpoint CP service 'A' 444 in step 550. In response, the endpoint CP service 'A' 444 places an API call in step 552 to the ancillary UI API service 'B' 144 to push any configuration policy changes to it, while likewise communicating any configuration policy changes to the workspace CP service 'C' 446 in step 540.

FIGS. 6a through 6e show the performance of certain user interactions with an ancillary user interface (UI) implemented in accordance with an embodiment of the invention. In this embodiment, an ancillary user interface (UI) 326 may be implemented as an adaptive row display (ARD), described in greater detail herein. As shown in FIG. 7a, the ancillary UI 326 may be implemented to display default control and information icons 708, as well as detect the proximity 606 of a human extremity, such as a finger.

Figure 6A:
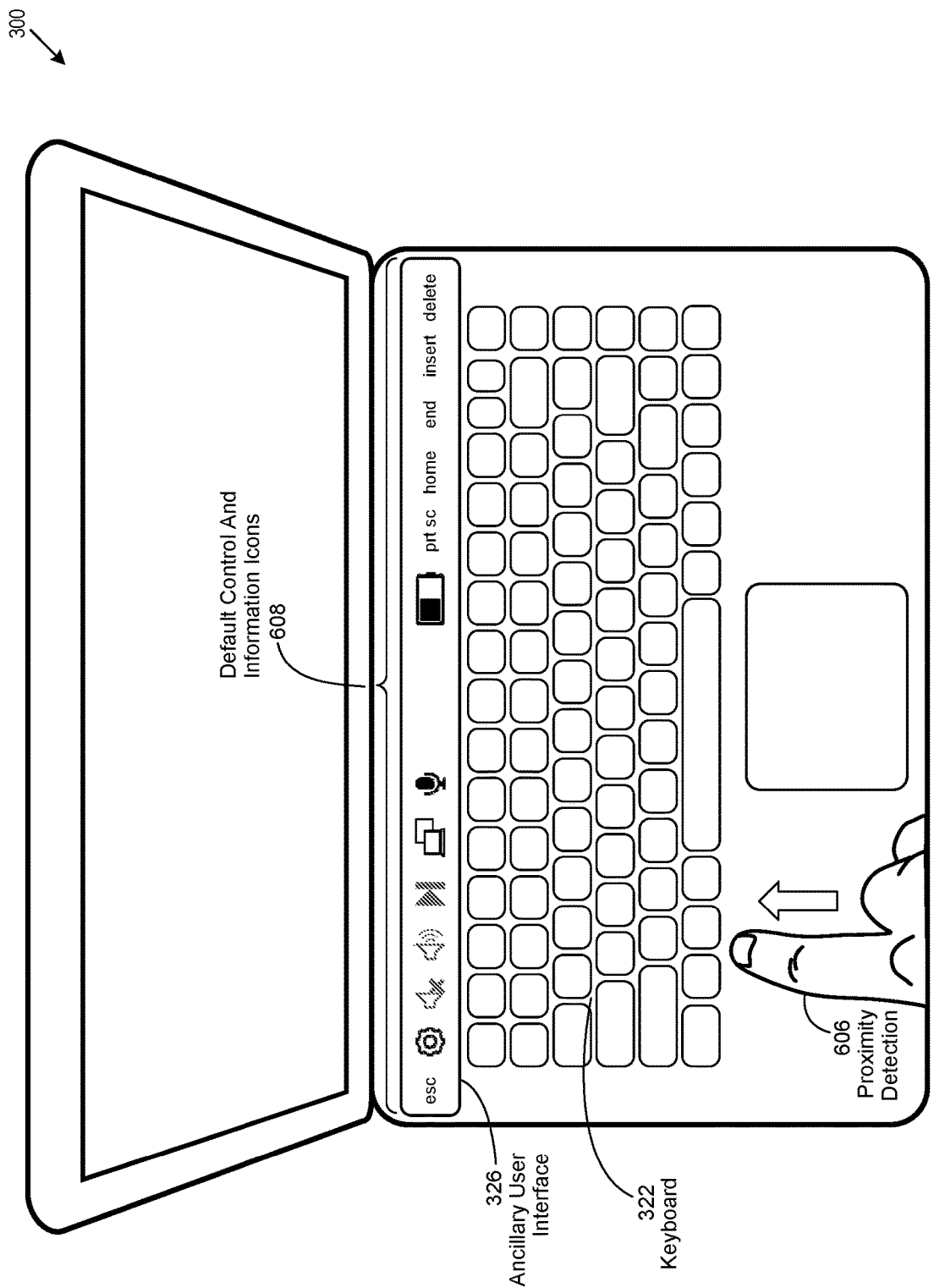
FIGS. 6a through 6e show the performance of certain user interactions with an ancillary user interface (UI).
Figure 6B:
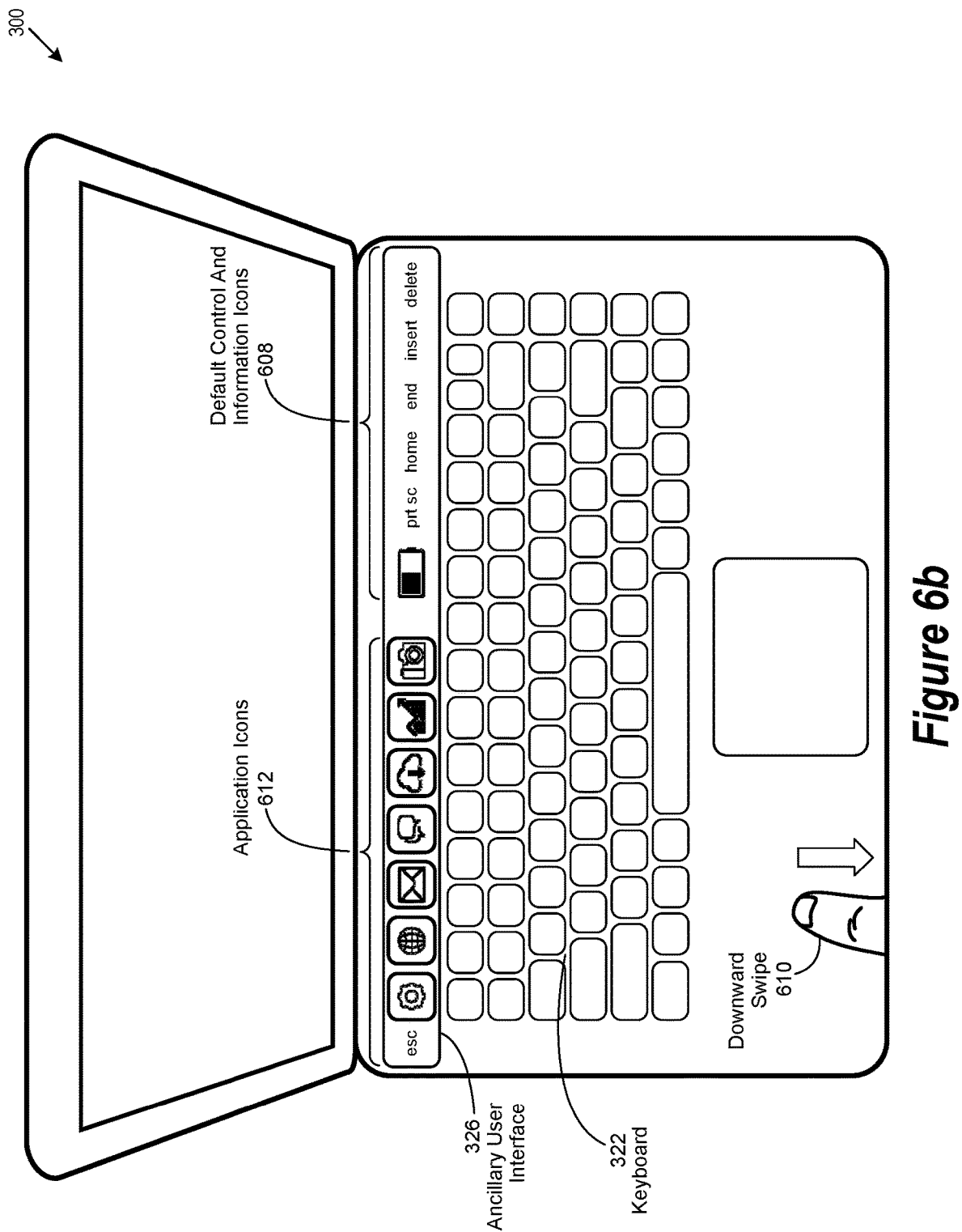
Figure 6C:
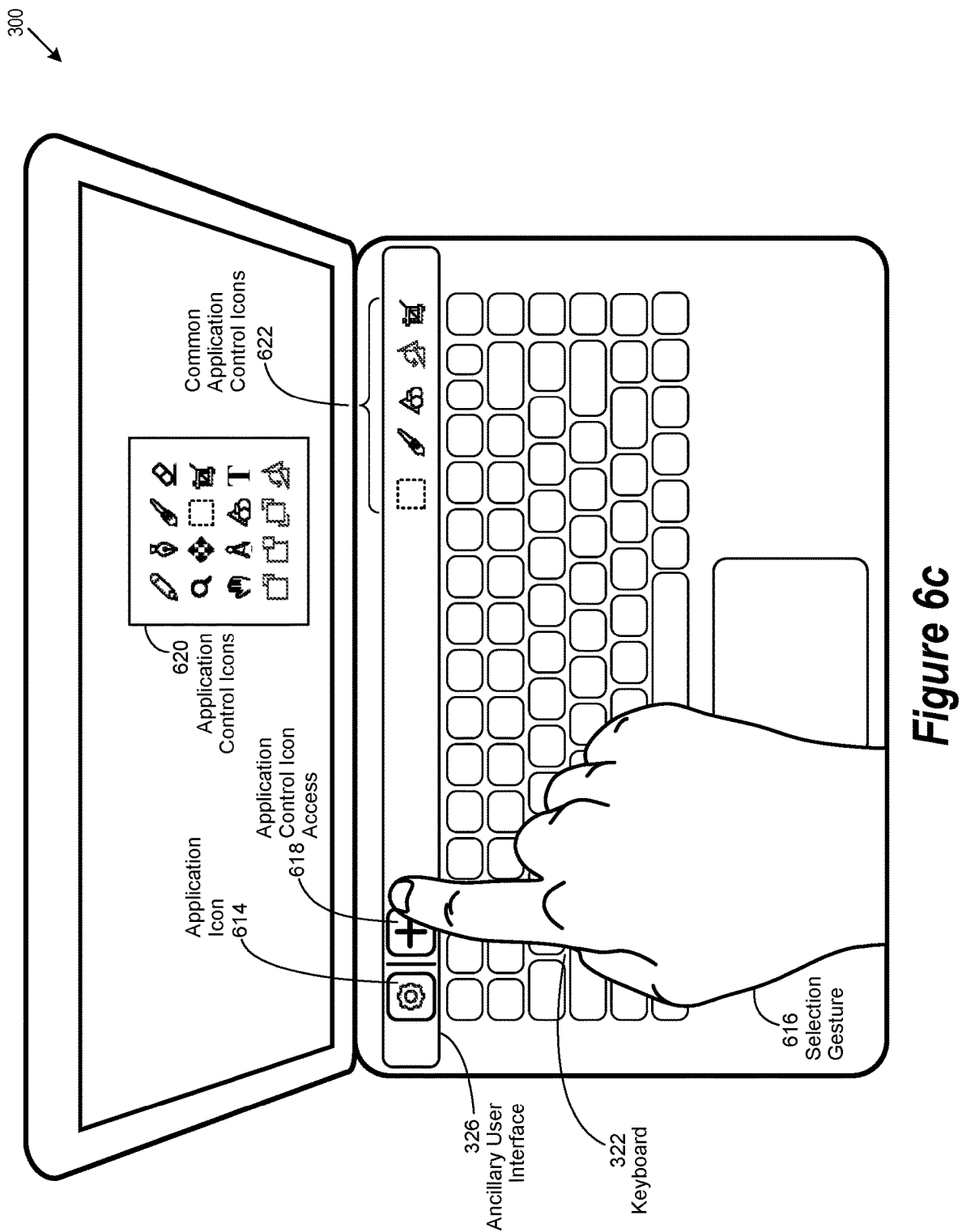

As shown in FIG. 6b, the ancillary UI 326 may likewise be implemented to detect certain user gestures, such as a downward swipe 610 of a user's finger. In this embodiment, such a user gesture may result in the display of certain application icons 612, as well as retaining the display of certain default control and information icons 708. Referring now to FIG. 6c, the ancillary UI 326 may be implemented to recognize a selection gesture 616 to select an application selection icon 614, an application control icon access icon 618, or one or more common application control icons 622. For example, using a selection gesture 616 to select the application control icon access icon 618 results in the display of one or more application control icons 620.

Figure 6D:
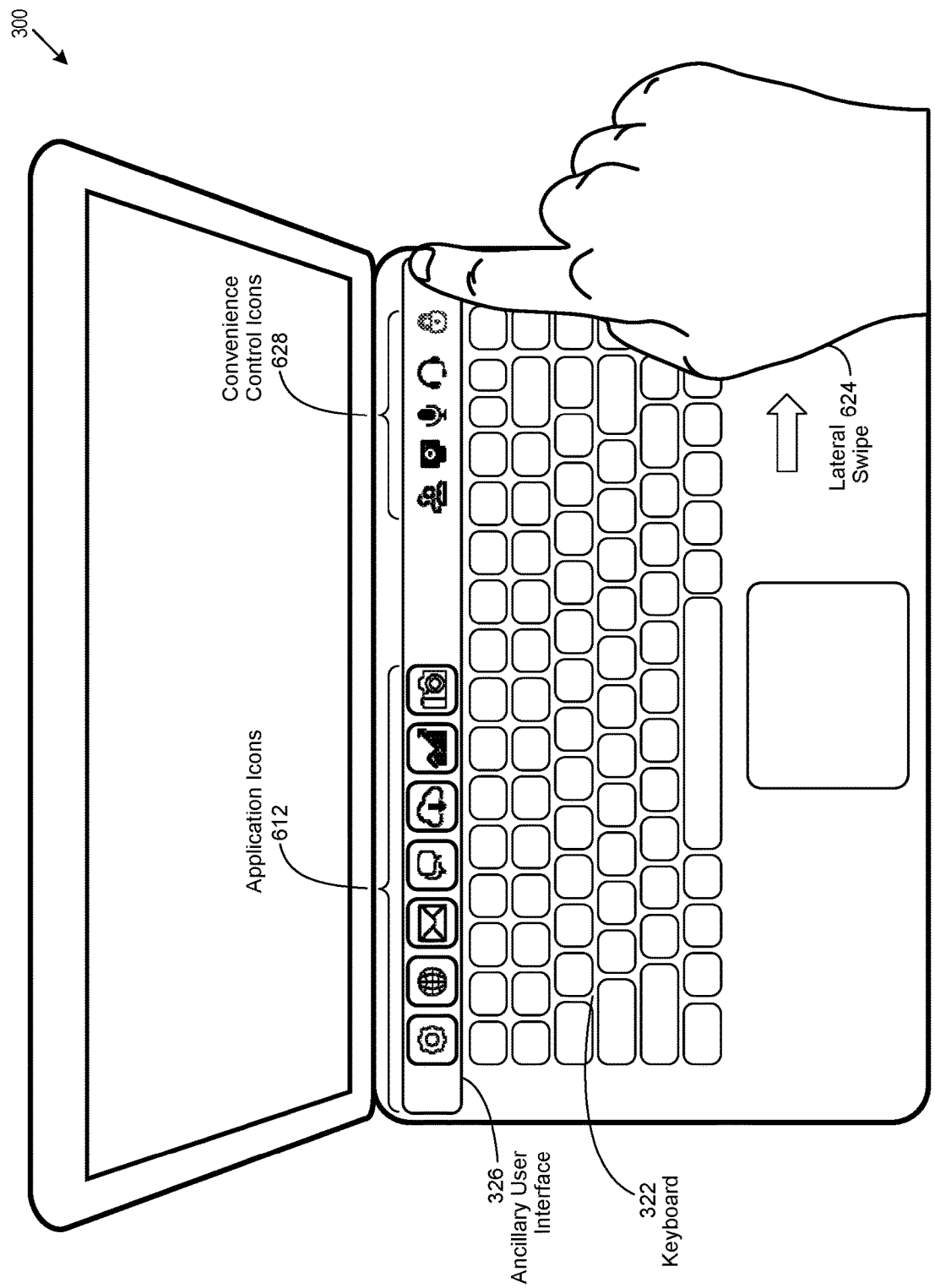
Figure 6E:
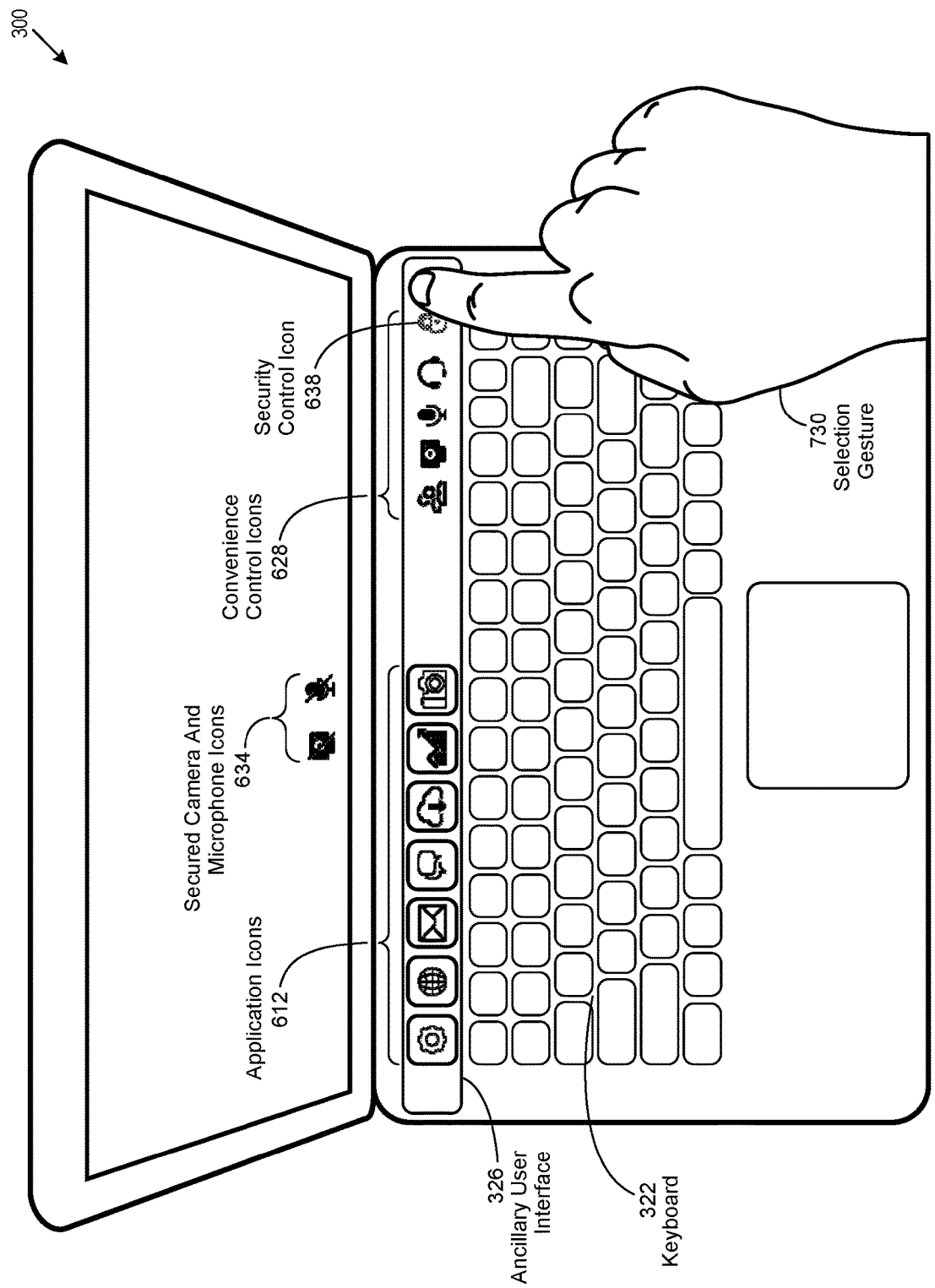

As shown in FIG. 6d, the ancillary UI 326 may be implemented recognize a particular user gesture, such as a lateral swipe 624, which may result in the display of one or more application icons 612, one or more convenience control icons 628, or a combination thereof. Referring to FIG. 6e, the ancillary UI 326 may be implemented to recognize a selection gesture 630, which can be used to select a particular convenience control icon 628, such a security control icon 632, which may be implemented to control the operational status of an associated camera and microphone. As an example, the user device 300 shown in FIG. 6e may currently be in a privacy optimized system configuration mode. Accordingly, as indicated by the secured camera and microphone icons 634, the user device 300 has completed its boot sequence with its camera shuttered and its microphone muted, as described in greater detail herein. Skilled practitioners of the art will recognize that many such embodiments and examples are possible. Accordingly, the foregoing is not intended to limit the spirit, scope, or intent of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as JAVA, SMALLTALK, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing an ancillary user interface adaptation operation, comprising:
   providing an information handling system with a primary integrated processor system and an ancillary integrated processor system, the primary integrated processor system executing a primary control point service, the ancillary integrated processor system executing an ancillary user interface application program interface service, the ancillary integrated processor system controlling an ancillary user interface via the ancillary user interface application program interface service, the ancillary user interface application program interface service performing an ancillary user interface adaptation operation;
   determining when a user initiates a change to the ancillary user interface; and,
   configuring the ancillary user interface in response to the change initiated by the user via the ancillary user interface application program interface service.

2. The method of claim 1, wherein:
   the configuring the ancillary user interface includes adapting an appearance of the ancillary user interface according to a current use of a particular workspace.

3. The method of claim 2, wherein:
   the adapting conforms to a particular configuration policy.

4. The method of claim 1, wherein:
   the ancillary UI is implemented as an adaptive row display.

5. The method of claim 1, further comprising:
   providing a back-end orchestrator service, the back-end orchestrator service providing orchestration and configuration policy information to at least one of the primary control point service and the ancillary user interface application program interface service.

6. The method of claim 1, wherein:
   the primary control point service comprises an endpoint control point service and a workspace control point service, the endpoint control service being implemented to be a control point for telemetry between the endpoint control service and the workspace control service, the workspace control service being implemented to provide a control point for inter-process communications between the workspace control service and the endpoint control service.

7. A system comprising:
a primary integrated processor system;
an ancillary integrated processor system;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
executing a primary control point service via the primary integrated processor system;
executing an ancillary user interface application program interface service, the ancillary integrated processor system controlling an ancillary user interface via the ancillary user interface application program interface service, the ancillary user interface application program interface service performing an ancillary user interface adaptation operation;
determining when a user initiates a change to the ancillary user interface; and,
configuring the ancillary user interface in response to the change initiated by the user via the ancillary user interface application program interface service.

8. The system of claim 7, wherein:
the configuring the ancillary user interface includes adapting an appearance of the ancillary user interface according to a current use of a particular workspace.

9. The system of claim 8, wherein:
the adapting conforms to a particular configuration policy.

10. The system of claim 9, wherein:
the ancillary UI is implemented as an adaptive row display.

11. The system of claim 7, wherein instructions executable by the processor are further configured for:
providing a back-end orchestrator service, the back-end orchestrator service providing orchestration and configuration policy information to at least one of the primary control point service and the ancillary user interface application program interface control point service.

12. The system of claim 7, wherein:
the primary control point service comprises an endpoint control point service and a workspace control point service, the endpoint control service being implemented to be a control point for telemetry between the endpoint control service and the workspace control service, the workspace control service being implemented to provide a control point for inter-process communications between the workspace control service and the endpoint control service.

13. A non-transitory, computer-readable storage medium embodying computer program code, the computer program code comprising computer executable instructions configured for:
executing a primary control point service via a primary integrated processor system;
executing an ancillary user interface application program interface service, the ancillary integrated processor system controlling an ancillary user interface via the ancillary user interface application program interface service, the ancillary user interface application program interface service performing an ancillary user interface adaptation operation;
determining when a user initiates a change to the ancillary user interface; and,
configuring the ancillary user interface in response to the change initiated by the user via the ancillary user interface application program interface service.

14. The non-transitory, computer-readable storage medium of claim 13, wherein:
the configuring the ancillary user interface includes adapting an appearance of the ancillary user interface according to a current use of a particular workspace.

15. The non-transitory, computer-readable storage medium of claim 14, wherein:
the adapting conforms to a particular configuration policy.

16. The non-transitory, computer-readable storage medium of claim 13, wherein:
the ancillary UI is implemented as an adaptive row display.

17. The non-transitory, computer-readable storage medium of claim 13, wherein:
providing a back-end orchestrator service, the back-end orchestrator service providing orchestration and configuration policy information to at least one of the primary control point service and the ancillary user interface application program interface service.

18. The non-transitory, computer-readable storage medium of claim 13, wherein:
the primary control point service comprises an endpoint control point service and a workspace control point service, the endpoint control service being implemented to be a control point for telemetry between the endpoint control service and the workspace control service, the workspace control service being implemented to provide a control point for inter-process communications between the workspace control service and the endpoint control service.

19. The non-transitory, computer-readable storage medium of claim 13, wherein:
the computer executable instructions are deployable to a client system from a server system at a remote location.

20. The non-transitory, computer-readable storage medium of claim 13, wherein:
the computer executable instructions are provided by a service provider to a user on an on-demand basis.

* * * * *